(12) United States Patent
Craft, Jr. et al.

(10) Patent No.: US 8,211,580 B2
(45) Date of Patent: Jul. 3, 2012

(54) ELECTRONICS CABINET WITH LIQUID COOLING SYSTEM FOR BACKUP POWER FUEL CELL

(75) Inventors: Thomas F. Craft, Jr., Murphy, TX (US); Anil K. Trehan, Plano, TX (US); David Reichert, Toronto (CA); Bryn Epp, Toronto (CA)

(73) Assignee: CommScope, Inc. of North Carolina, Hickory, NC (US)

( * ) Notice: Subject to any disclaimer, the term of this patent is extended or adjusted under 35 U.S.C. 154(b) by 492 days.

(21) Appl. No.: 12/416,087

(22) Filed: Mar. 31, 2009

(65) Prior Publication Data

US 2009/0269636 A1  Oct. 29, 2009

Related U.S. Application Data

(60) Provisional application No. 61/041,575, filed on Apr. 1, 2008, provisional application No. 61/047,016, filed on Apr. 22, 2008, provisional application No. 61/047,031, filed on Apr. 22, 2008.

(51) Int. Cl.
 *H01M 6/16* (2006.01)
(52) U.S. Cl. ...................................... 429/434
(58) Field of Classification Search .............. 429/434, 429/435–437, 452–458
 See application file for complete search history.

(56) References Cited

U.S. PATENT DOCUMENTS

| | | | |
|---|---|---|---|
| 3,523,830 A | 8/1970 | Baker et al. | |
| 4,782,669 A | 11/1988 | Trocciola et al. | |
| 5,200,278 A * | 4/1993 | Watkins et al. | 429/413 |
| 5,314,762 A | 5/1994 | Hamada et al. | |
| 5,316,869 A * | 5/1994 | Perry et al. | 429/434 |
| 5,616,431 A | 4/1997 | Kusunoki et al. | |
| 6,087,028 A | 7/2000 | Goto | |
| 6,098,175 A * | 8/2000 | Lee | 713/320 |
| 6,232,006 B1 | 5/2001 | Breault | |
| 6,673,482 B2 | 1/2004 | Imazeki et al. | |
| 6,885,112 B2 | 4/2005 | Johnson | |
| 6,916,566 B2 | 7/2005 | Saloka et al. | |
| 7,005,206 B2 | 2/2006 | Lawrence et al. | |
| 7,100,385 B2 | 9/2006 | Craft, Jr. et al. | |
| 7,205,062 B2 | 4/2007 | Tawfik et al. | |
| 7,264,895 B2 | 9/2007 | White | |
| 7,316,855 B2 | 1/2008 | Lawrence et al. | |
| 7,602,073 B2 | 10/2009 | Meyers et al. | |
| 2001/0049039 A1 | 12/2001 | Haltiner, Jr. | |
| 2002/0037447 A1 | 3/2002 | Imaseki et al. | |
| 2002/0119354 A1 | 8/2002 | O'Brien et al. | |
| 2003/0031904 A1 | 2/2003 | Haltiner, Jr. | |
| 2003/0039872 A1* | 2/2003 | Grasso et al. | 429/24 |
| 2003/0039873 A1* | 2/2003 | Condit et al. | 429/26 |
| 2003/0087139 A1 | 5/2003 | White | |

(Continued)

FOREIGN PATENT DOCUMENTS

EP  1 187 242  3/2002

(Continued)

*Primary Examiner* — Jean F Duverne
(74) *Attorney, Agent, or Firm* — Muncy, Geissler, Olds & Lowe, PLLC

(57) ABSTRACT

A fuel cell cabinet liquid cooling system is provided. The fuel cell cabinet liquid cooling system includes a fuel cell, a liquid cooling system for dissipating heat generated by the fuel cell, and a controller that controls the liquid cooling system for maintaining a predetermined temperature range of a first cooling liquid of the fuel cell.

34 Claims, 14 Drawing Sheets

U.S. PATENT DOCUMENTS

| | | | |
|---|---|---|---|
| 2003/0170528 | A1 | 9/2003 | Simpson et al. |
| 2004/0053104 | A1 | 3/2004 | Novkov et al. |
| 2004/0146761 | A1 | 7/2004 | Cargnelli et al. |
| 2004/0161657 | A1 | 8/2004 | Simpson et al. |
| 2005/0004716 | A1* | 1/2005 | Lillis et al. .................... 700/287 |
| 2005/0074644 | A1 | 4/2005 | Ueda et al. |
| 2005/0091922 | A1 | 5/2005 | Goebel et al. |
| 2005/0129990 | A1 | 6/2005 | Ozeki et al. |
| 2005/0181244 | A1* | 8/2005 | Porter et al. .................... 429/12 |
| 2005/0262818 | A1 | 12/2005 | Stenersen |
| 2006/0027547 | A1* | 2/2006 | Silvestro ....................... 219/133 |
| 2006/0078777 | A1 | 4/2006 | Grimes et al. |
| 2006/0105209 | A1 | 5/2006 | Thyroff et al. |
| 2006/0151156 | A1 | 7/2006 | Valensa et al. |
| 2006/0166056 | A1 | 7/2006 | Nakamura et al. |
| 2006/0199064 | A1 | 9/2006 | Arnold et al. |
| 2006/0204412 | A1 | 9/2006 | Rizzo et al. |
| 2006/0246328 | A1 | 11/2006 | Willets et al. |
| 2007/0059583 | A1 | 3/2007 | Vinsant |
| 2007/0275281 | A1 | 11/2007 | White |
| 2008/0038610 | A1 | 2/2008 | Darling |
| 2008/0138671 | A1 | 6/2008 | Kolodziej et al. |
| 2008/0268300 | A1 | 10/2008 | Pfefferle |
| 2009/0035616 | A1* | 2/2009 | Darling et al. .................. 429/13 |
| 2009/0045680 | A1* | 2/2009 | Litch et al. ...................... 307/66 |
| 2009/0123797 | A1 | 5/2009 | Kaye et al. |
| 2009/0304558 | A1* | 12/2009 | Patton et al. ................... 422/148 |
| 2010/0132351 | A1* | 6/2010 | Silvestro ......................... 60/327 |
| 2010/0221642 | A1 | 9/2010 | Frahm et al. |
| 2011/0039177 | A1 | 2/2011 | Yamaga et al. |

FOREIGN PATENT DOCUMENTS

| | | |
|---|---|---|
| WO | 2008/016257 | 2/2008 |

* cited by examiner

ELECTRONICS CABINET WITH LIQUID COOLING SYSTEM FOR BACKUP POWER FUEL CELL

CLAIM OF PRIORITY UNDER 35 U.S.C. §119

The present invention claims the benefit of Provisional Application No. 61/041,575 entitled "Liquid Cooling System for Fuel Cell Cabinets, Air Feed System for Fuel Cell Cabinets, Heat Management and Thermal Control of Cabinets for Fuel Cells, and EcoPower Cabinet" filed Apr. 1, 2008, Provisional Application No. 61/047,016 entitled "Cabinet Air Feed and Exhaust System for Hydrogen Fuel Cell Declassification" filed Apr. 22, 2008, and Provisional Application No. 61/047,031 entitled "Fuel Cell Cabinet Waste Water Management System" filed Apr. 22, 2008, the entire contents of which are hereby incorporated by reference.

REFERENCE TO CO-PENDING APPLICATIONS FOR PATENT

The present Application for patent is related to the following co-pending U.S. patent applications:

"ELECTRONICS CABINET WITH AIR FEED SYSTEM FOR BACKUP POWER FUEL CELL" (U.S. application Ser. No. 12/416,096), filed Mar. 31, 2009, assigned to the assignee hereof, and the entire contents of which are hereby incorporated by reference;

"ELECTRONICS CABINET WITH HEAT MANAGEMENT AND THERMAL CONTROL SYSTEM FOR BACKUP POWER FUEL CELL" (U.S. application Ser. No. 12/416,106), filed Mar. 31, 2009, assigned to the assignee hereof, and expressly incorporated by reference herein;

"ELECTRONICS CABINET WITH AIR FEED AND EXHAUST SYSTEM FOR BACKUP POWER FUEL CELL" (U.S. application Ser. No. 12/416,113), filed Mar. 31, 2009, assigned to the assignee hereof, and expressly incorporated by reference herein; and "ELECTRONICS CABINET WITH WASTE WATER MANAGEMENT SYSTEM FOR BACKUP POWER FUEL CELL" (U.S. application Ser. No. 12/416,116), filed Mar. 31, 2009, assigned to the assignee hereof, and expressly incorporated by reference herein.

FIELD OF THE INVENTION

The present invention relates to cabinets for housing electronic equipment. More particularly, the present invention relates to a cabinet for housing electronic equipment and a connection panel for cross-connecting the electronic equipment with various provider and/or subscriber lines, wherein the cabinet includes a fuel cell power backup system, and more particularly, to a fuel cell cabinet having a liquid cooling system for the fuel cell power backup system.

BACKGROUND OF THE INVENTION

Outdoor cabinets that house electronic equipment and connection panels are generally known in the art. The connection panel (sometimes referred to as a feeder-distribution interface), within the cabinet, is used to connect subscriber lines to provider lines directly, or in parallel or serial, with terminals of certain electronic equipment also within the cabinet, such as surge protectors, switches, servers, etc.

In some conventional cabinets, the electronic equipment includes a fuel cell power backup system. The electronic equipment may be sensitive to temperature and humidity and the air and the electronic equipment in the interior of the cabinet may be environmentally controlled by employing a heat exchanger, dehumidifier, and/or air conditioner. Many conventional systems are air cooled and therefore reduce power density. Conventional air cooled systems may require increased maintenance. Additionally, many conventional systems require a large foot print for the cabinet. Many conventional systems are limited with respect to the outdoor exposure temperatures in which they can operate. That is, many conventional systems cannot operate in extreme cold or hot climates.

SUMMARY OF THE INVENTION

These problems and others are addressed by the present invention, a first aspect of which comprises a fuel cell cabinet liquid cooling system comprising a fuel cell, a liquid cooling system for dissipating heat generated by the fuel cell, and a controller that controls the liquid cooling system for maintaining a predetermined temperature range of a first cooling liquid of the fuel cell.

Another aspect comprises a fuel cell cabinet liquid cooling system including a fuel cell, an internal loop liquid cooling system for dissipating heat in the fuel cell, and an external loop liquid cooling system for dissipating heat in the internal loop liquid cooling system.

Another aspect comprises a fuel cell cabinet liquid cooling system including a fuel cell, a liquid-to-air heat exchanger that dissipates heat from the fuel cell to an outside environment of the fuel cell cabinet, and a pump that circulates one or more cooling liquids between the fuel cell and the liquid-to-liquid heat exchanger.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

Figure 1A:
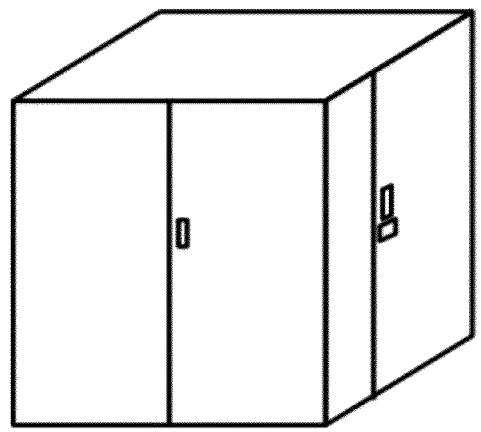
FIG. 1A is a perspective view of a cabinet, according to an embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Exemplary aspects are directed to cabinets for housing electronic equipment, wherein the cabinet includes a fuel cell power backup system, and more particularly, to a fuel cell cabinet having a liquid cooling system for the fuel cell power backup system.

Conventional cabinets and the electronic equipment in the interior of the cabinets commonly are air cooled. The aspects recognize that stabilizing and maintaining a substantially constant temperature of the interior environment of the fuel cell cabinet may increase the power density of the fuel cell system. The aspects also may reduce the time needed for the fuel cell to reach full power. The aspects provide a fast response system, and therefore, require less bridging power (i.e., batteries).

The aspects provide a low cost cooling system for a fuel cell cabinet. The aspects provide redundancy to reduce or eliminate system failures. The aspects improve the efficiency of the fuel cell cabinet. The aspects maintain proper water and/or air temperatures for the fuel cell and interior of the fuel cell cabinet, which may enable the fuel cell to achieve faster power output. The aspects also may add or extend the life of the system. For example, by maintaining the temperature of the cooling liquid and/or the air feed to the fuel cell, and/or the temperature in the interior of the fuel cell cabinet within a predetermined acceptable range, the aspects may extend the life of the fuel cell. More particularly, by maintaining the temperature of the fuel cell, for example, between 60° C. and 65° C., the aspects may extend the life of the fuel cell. The aspects also provide a system having a higher power density.

The aspects can reduce the cabinet size compared with conventional systems such that the size of the foot print required for the fuel cell cabinet is reduced, while providing the same power. The aspects also provide a system that is not limited by outdoor exposure temperatures and can operate in extreme cold or hot climates. The aspects also can utilize a standard telecom cabinet, thereby increasing a comfort level of a user of the cabinet.

The aspects also can reduce the noise levels associated with the cabinet in comparison with conventional high power backup systems.

Exemplary aspects will now be described with reference to FIGS. 1-15.

Figure 1B:
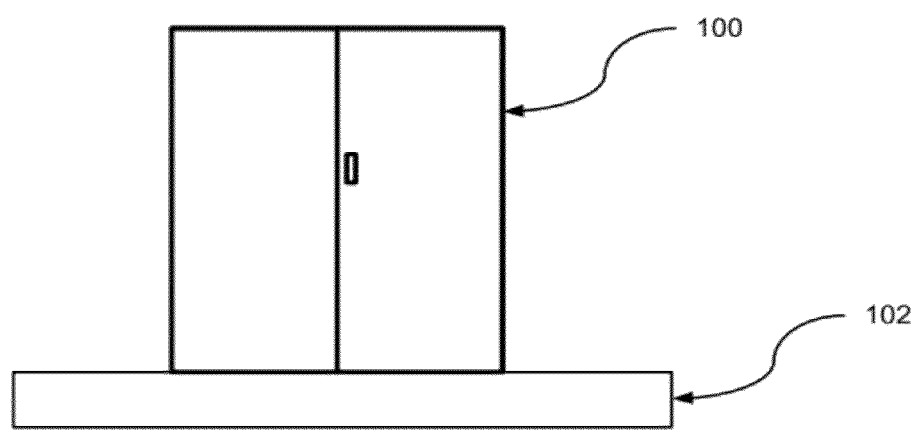
FIG. 1B is a plan view of a cabinet, according to an embodiment of the invention.

A fuel cell cabinet 100 according to an embodiment is illustrated in FIGS. 1A and 1B. The fuel cell cabinet may house electronic equipment and a connection panel for cross-connecting the electronic equipment with various provider and/or subscriber lines. The fuel cell cabinet 100 includes a fuel cell power backup system.

As shown in FIG. 1B, the fuel cell cabinet 100 can be mounted on the surface of, for example, a concrete pad 102. The surface upon which the fuel cell cabinet 100 can be mounted is not limited to a concrete pad 102 and can include any suitable surface, device, or structure, such as a pad or mounting surface formed from fiberglass, plastic, metal, etc. Aspects of the fuel cell cabinet can be mounted in the interior of buildings, structures, etc., or at the exterior of building, structures, etc. For example, an aspect of a fuel cell cabinet 100 can be mounted on a rack or shelter or other structure (not shown).

Figure 2:
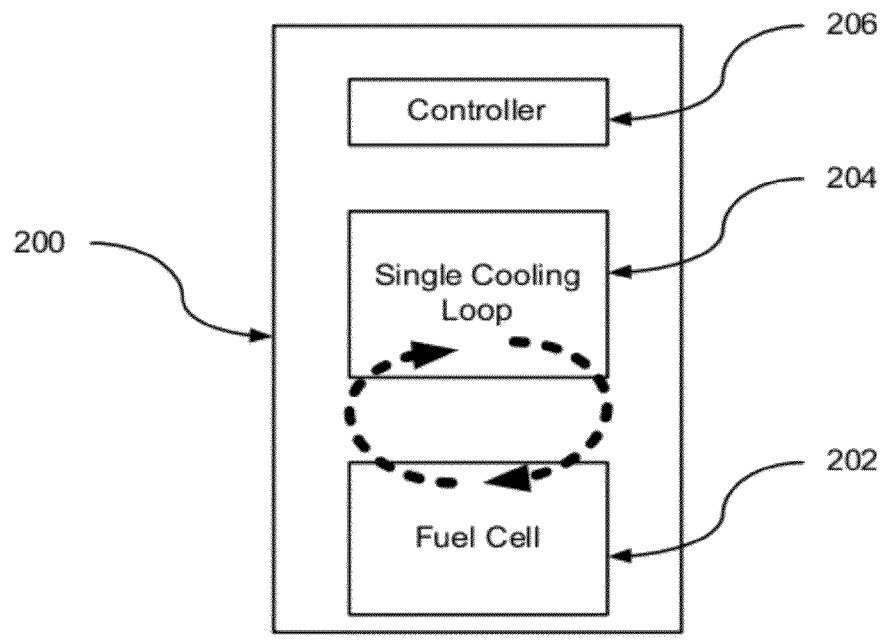
FIG. 2 is a schematic of a cabinet, according to an embodiment of the invention.

As shown in FIG. 2, an exemplary aspect of a fuel cell cabinet 200 includes a fuel cell 202 and a single cooling loop 204 for stabilizing and maintaining a substantially constant temperature of the fuel cell 202. An embodiment of the system includes a controller 206 that selectively turns the single cooling loop ON and OFF to operate the fuel cell at defined or predetermined fuel temperature set points. The fuel temperature set points can be based on factors including, but not limited to, the number of fuel cells, the type of fuel cells, the output of the fuel cells, the outside temperature or environmental temperature of the cabinet, the climate in which the cabinet is deployed, etc.

Figure 3:
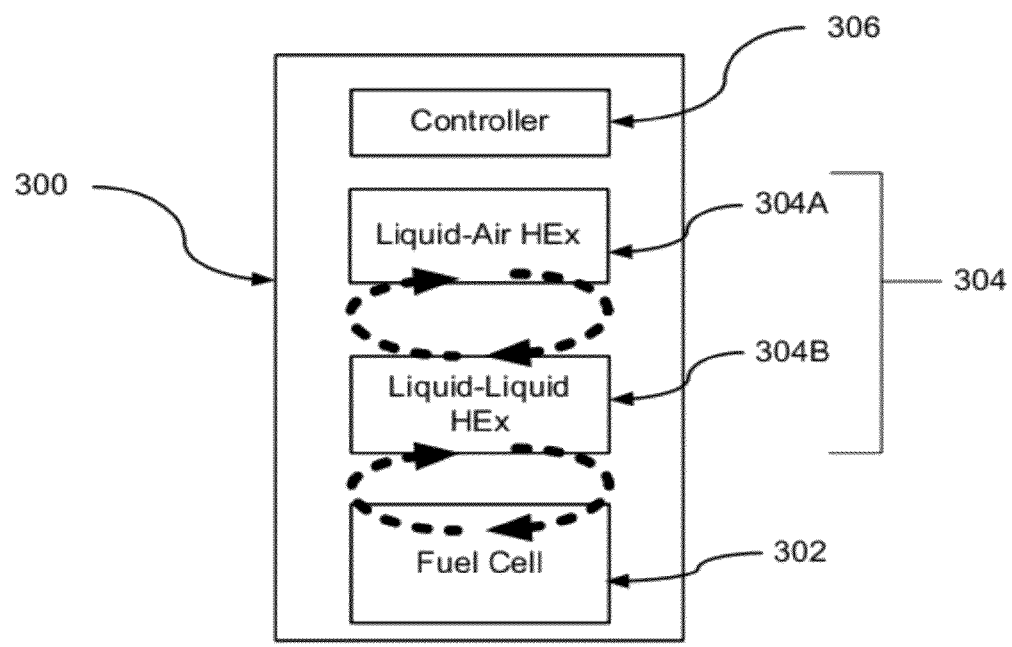
FIG. 3 is a schematic of a cabinet, according to an embodiment of the invention.

As shown in FIG. 3, an exemplary aspect of a fuel cell cabinet 300 includes a fuel cell 302 and a dual cooling loop 304, for example, including a liquid to air heat exchanger (L-A Hex) 304A and a liquid to liquid heat exchanger (L-L Hex) 304B, for stabilizing and maintaining a substantially constant temperature of the fuel cell 302. An aspect of the system includes a controller 306 that selectively turns the dual cooling loops ON and OFF to operate the fuel cell at defined or predetermined fuel temperature set points. The fuel temperature set points can be based on factors including, but not limited to, the number of fuel cells, the type of fuel cells, the output of the fuel cells, the outside temperature or environmental temperature of the cabinet, the climate in which the cabinet is deployed, etc.

Figure 4:
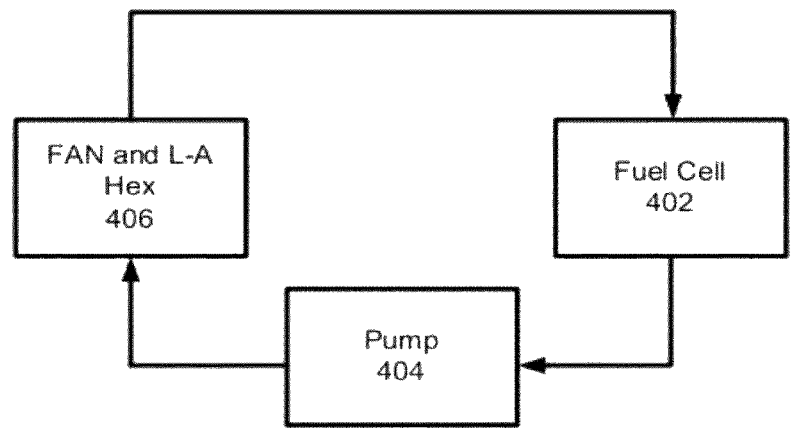
FIG. 4 is a schematic of a cabinet, according to an embodiment of the invention.

FIG. 4 is a schematic illustrating an exemplary aspect of a single cooling loop fuel cell cabinet. In this aspect, a cooling liquid is pumped through the fuel cell 402 by a pump 404. A fan and a liquid-to-air heat exchanger assembly (Fan/L-A Hex assembly) 406 (e.g., a radiator fan and a radiator) transfers the heat from the fuel cell 402 to the outside environment of the cabinet. In alternative aspects, the fan and liquid-to-air heat exchanger assembly 406 may be replaced by a liquid-to-liquid heat exchanger and connected directly to plant water lines for cooling. The single cooling loop fuel cell cabinet may provide a simple, inexpensive, and efficient means for cooling the fuel cell 402. This aspect may be particularly suitable for use in moderate or warm climates. The liquid used in the cooling loop water may be water, deionized water (DI), ethylene glycol water (EGW), another suitable liquid, or a mixture of one or more liquids. The pump 404 may include one or more pumps for circulating the liquid. Other cooling loop arrangements are contemplated within the spirit and scope of the invention. The single cooling loop may increase efficiency of the system, stabilize and maintain the temperature of the fuel cell, improve the capability of the system to reach full power faster, and/or extend the life of the system.

In operation, the single cooling loop fuel cell cabinet may selectively operate the pump 404, the fan, and/or the liquid-to-liquid heat exchanger depending on the amount of thermal control required, which may be based on the external temperature, the temperature of the liquid, and/or the number of fuel cells 402, etc.

Figure 5:
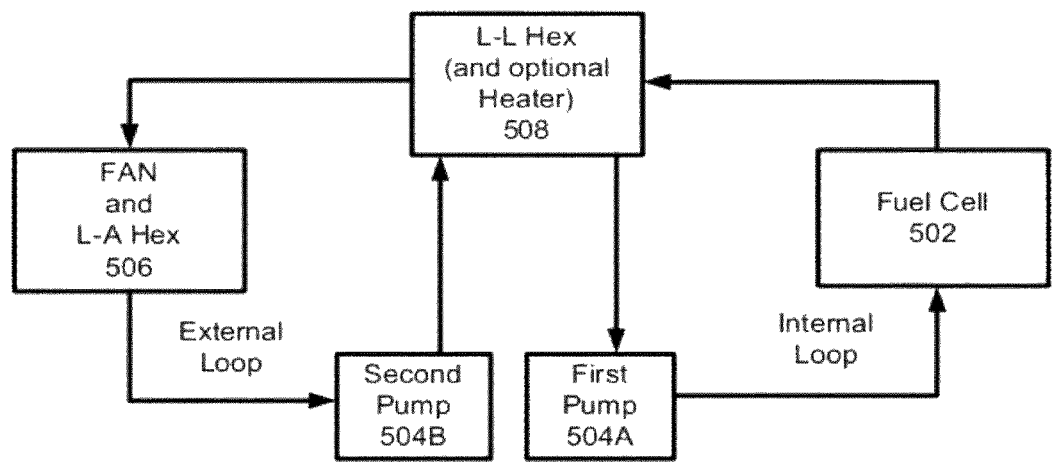
FIG. 5 is a schematic of a cabinet, according to an embodiment of the invention.

FIG. 5 is a schematic illustrating an exemplary aspect of a dual cooling loop fuel cell cabinet, which includes an internal loop and an external loop (e.g., a first loop and a second loop). In this aspect, a first cooling liquid is pumped through the fuel cell 502 by a first pump 504A. The heat from the fuel cell 502 is transferred by the first liquid to a liquid-to-liquid heat exchanger 508.

A second cooling liquid is pumped through the liquid-to-liquid heat exchanger 508 by a second pump 504B. The heat from the fuel cell 502 is transferred to the second liquid in the liquid-to-liquid heat exchanger (L-L Hex) 508. The heat from the second liquid is transferred to a fan and a liquid-to-air heat exchanger assembly (Fan/L-A Hex assembly) 506 (e.g., radiator fan and a radiator), which then transfers the heat from the fuel cell to the outside environment of the cabinet.

The dual cooling loop fuel cell cabinet may provide a simple, inexpensive, and efficient means for cooling the fuel cell 502. This aspect may be particularly suitable for use in moderate or colder climates. The liquid used in the cooling loop water may be water, deionized water (DI), ethylene glycol (EGW), another suitable liquid, or a mixture of one or more liquids. The pumps 504A and 504B may include one or more pumps for circulating the liquid and for providing higher redundancy for higher reliability. For example, redundant pumps may be provided to reduce or eliminate system failures. Other cooling loop arrangements are contemplated within the spirit and scope of the invention.

In another aspect, the liquid-to-liquid heat exchanger 508 may include a heater for heating the liquid in the internal loop and/or the external loop. This aspect may be particularly suitable in cold climates for maintaining a minimum temperature of the liquid entering the fuel cell 502 to optimize the operation of the fuel cell 502. The dual cooling loop may increase efficiency of the system, stabilize and maintain the temperature of the fuel cell, improve the capability of the system to reach full power faster, and/or extend the life of the system.

In operation, the dual cooling loop fuel cell cabinet may selectively operate the pumps 504A and 504B, the fan of the fan/L-A Hex assembly 506, the liquid-to-liquid heat exchanger 508, and/or the heater depending on the amount of thermal control required, which may be based on the external temperature, the temperature of the first and second liquid, and/or the number of fuel cells 502, etc.

Figure 6:
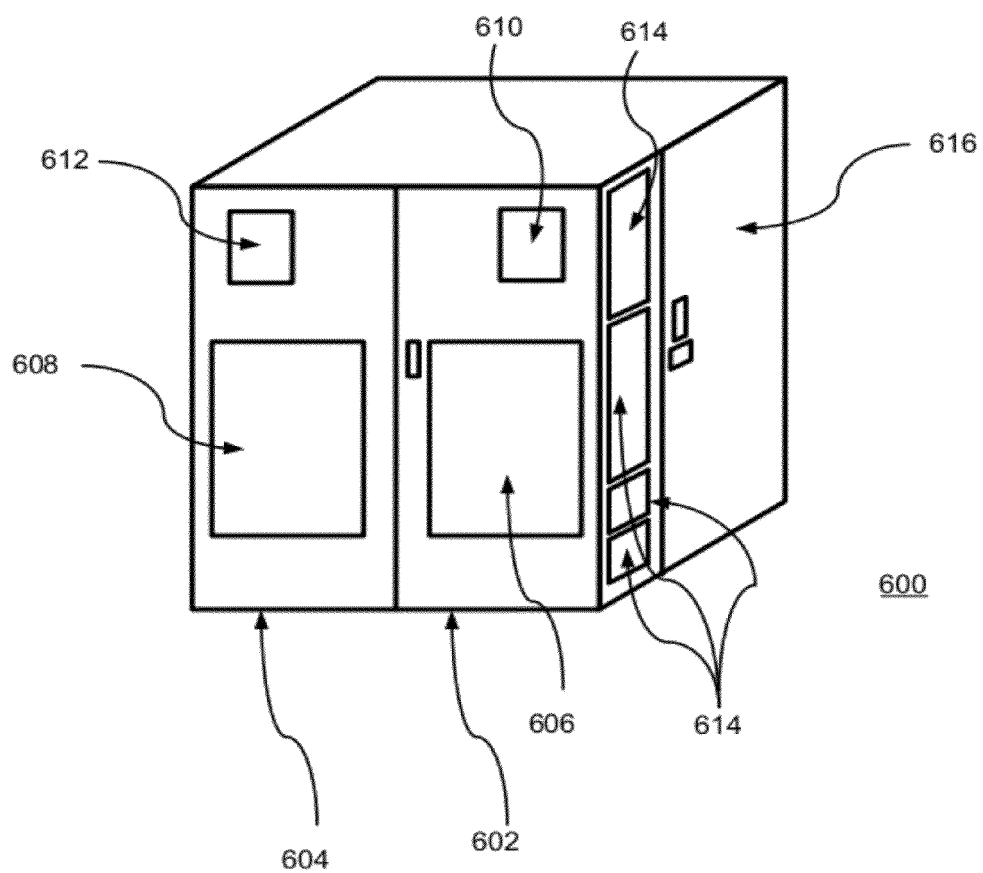
FIG. 6 is a perspective view of a cabinet, according to an embodiment of the invention.

FIG. 6 shows an aspect of a fuel cell cabinet 600 having one or more fuel cells and a single or dual cooling loop. The fuel cell cabinet 600 includes four sides, a top, and a bottom. The fuel cell cabinet 600 includes one or more doors 602, 604 on a first side of the cabinet 600. The cabinet 600 includes one or more doors 616 on a second side of the cabinet 600. The fuel cell cabinet 600 also may include one or more doors on the third and/or fourth side of the cabinet 600, which are not shown in FIG. 6. The doors 602, 604 and second side of the cabinet 600 may include air inlet and door perforations 610, 612, and 614. The fuel cell cabinet 600 includes air exits 606 and 608 on one or more sides, such as the first side.

Figure 7:
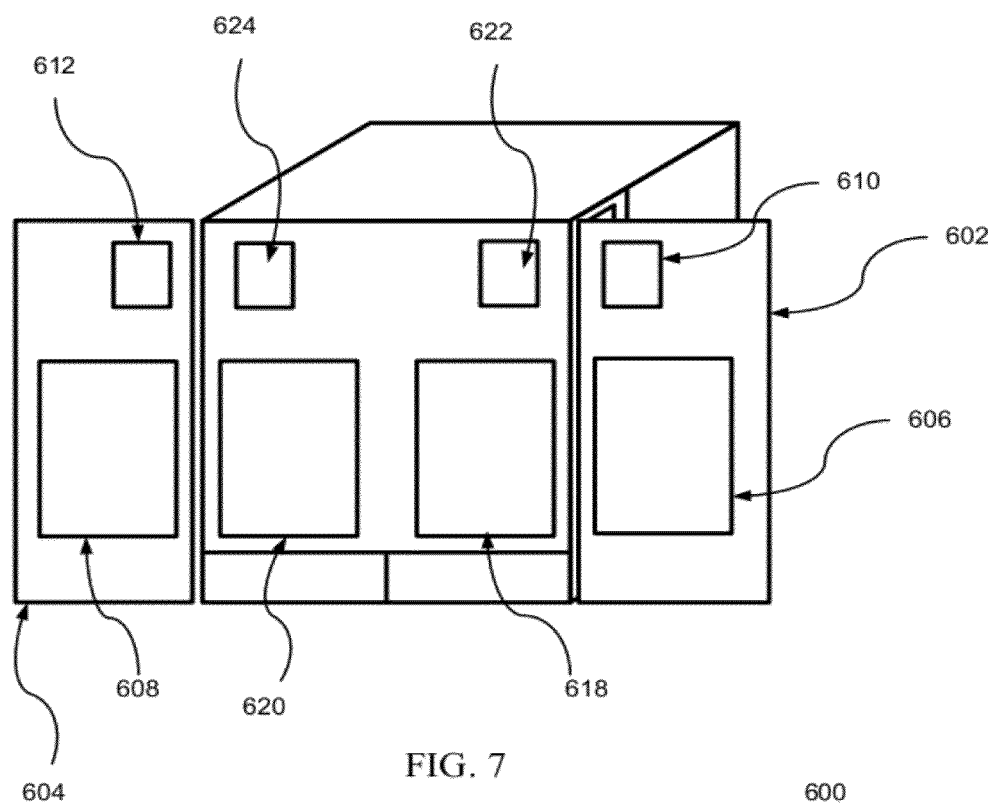
FIG. 7 is another perspective view of the cabinet of FIG. 6.

FIG. 7 shows an aspect of the fuel cell cabinet 600 of FIG. 6 with the doors 602, 604 in an open position. The cabinet 600 includes one or more fan and liquid-to-air heat exchanger assemblies (Fan/L-A Hex assemblies) 618, 620 (e.g., radiator fans and radiators) that cooperate with the air exhaust and door perforations 606, 608 of the doors 602, 604. The cabinet 600 also may include one or more air filters 622, 624 that cooperate with the air inlets and door perforations 610, 612 of the doors 602, 604.

Figure 8:
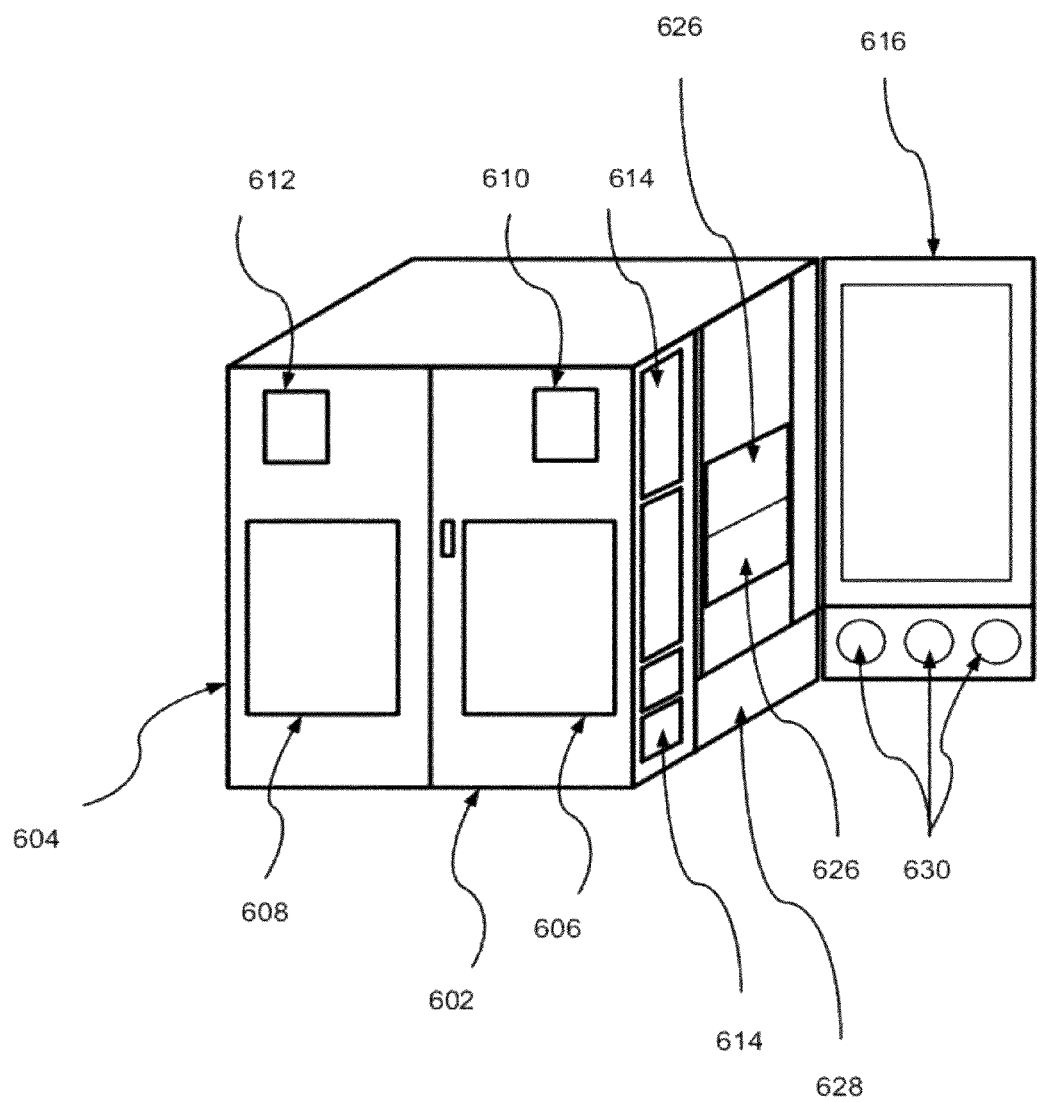
FIG. 8 is another perspective view of the cabinet of FIG. 6.

FIG. 8 shows an aspect of the fuel cell cabinet 600 of FIG. 6 with the door 616 in an open position. The cabinet 600 includes one or more fuel cells 626 disposed and mounted in the interior of the cabinet 600. The cabinet may include a rack or shelving system for mounting or securing the fuel cells 626 inside the cabinet 600. The cabinet 600 includes a battery compartment 628 for mounting or securing backup batteries. The door 616 may include a fan system 630 including one or more fans for venting or exhausting air or gases from the battery compartment 628.

The fuel cell cabinet 600 may include one or more cooling loops for controlling the temperature of the fuel cells 626, such as a single cooling loop of FIG. 4 or a dual cooling loop of FIG. 5. One of ordinary skill in the art will recognize that the single or dual cooling loops can be incorporated into the fuel cell cabinet in a variety of ways and may include a number of configurations and elements for providing the single or dual cooling loops. The present invention is not limited to the exemplary aspects described herein.

Figure 9A:
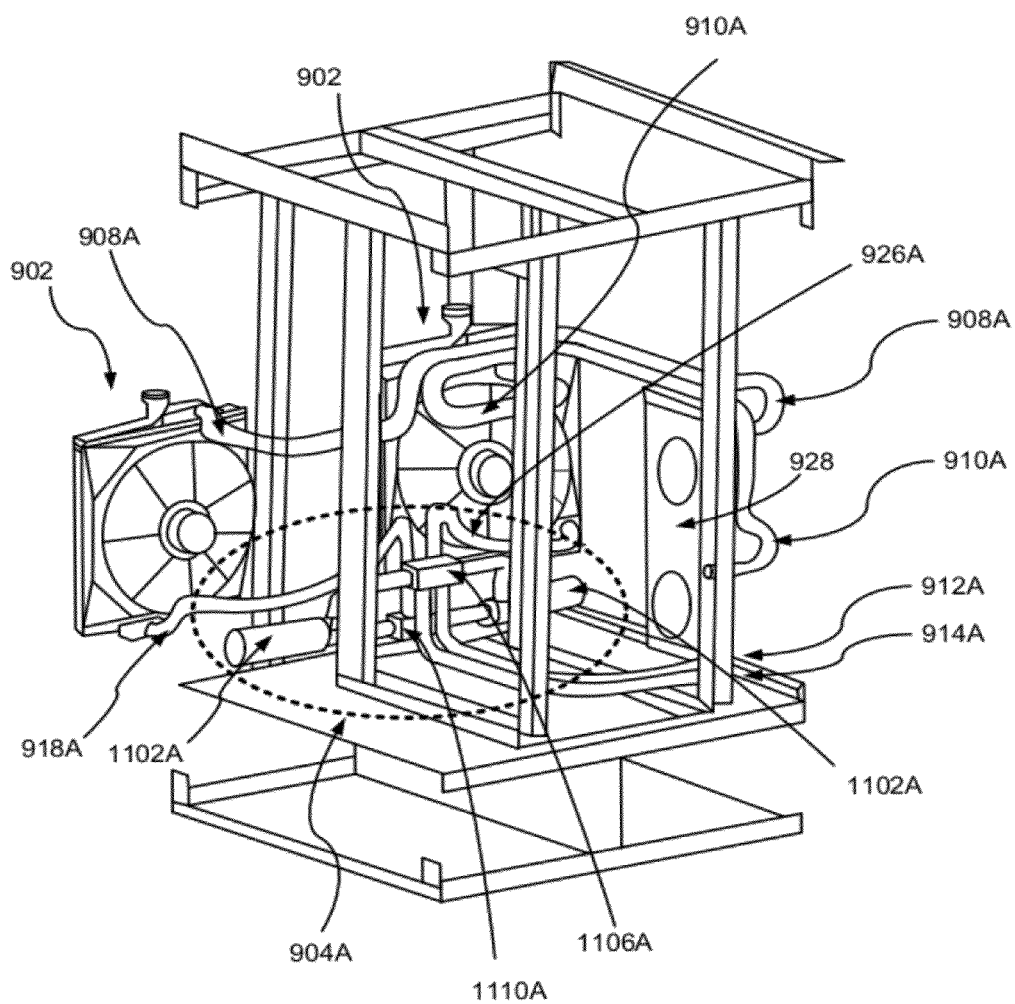
FIG. 9A is a partial view of a cabinet, according to an embodiment of the invention.

For example, FIG. 9A shows an exemplary aspect of a fuel cell cabinet 900 having one or more fuel cells and a single cooling loop. The fuel cells are not illustrated in FIG. 9A so that the remainder of the system can be seen. The single cooling loop may increase efficiency of the system, stabilize and maintain the temperature of the fuel cell, improve the capability of the system to reach full power faster, and/or extend the life of the system.

As shown in FIG. 9A, the single cooling loop includes a pump assembly 904A and a fan assembly (e.g., radiator assembly) 902. In the exemplary aspect, the pump assembly 904A includes redundant pumps 1102A for drawing or pumping (i.e., circulating) a liquid through one or more fuel cells (not shown) via lines 918A, 926A, 912A, 914A, 908a, and 910A.

The pump assembly 904A can include one or more manifolds 1110A connecting one end of each of the lines 918A and 926A to a first connection on each respective redundant pump 1102A. The other end of each of the lines 918A and 926A can be connected to the fan assembly 902, as shown in FIG. 9A.

The pump assembly 904A also can include one or more manifolds 1106A connecting one end of each of the lines 912A and 914A to a second connection on each respective redundant pump 1102A. The other end of each of the lines 912A and 914A can be connected to the one or more fuel cells (not shown).

A first end of each of the lines 908A and 910A can be connected to the one or more fuel cells (not shown) and a second end of each of the lines 908A and 910A can be connected to the fan assembly 902, as shown in FIG. 9A.

In operation, the liquid is pumped or drawn through lines 912A and 914A by the pump assembly 904A. The liquid enters one or more fuel cells (not shown). The liquid exits the fuel cells and is pumped or drawn through lines 908A and 910A to the fan assembly 902 (e.g., fan/radiator assembly). The heat from the liquid is transferred to the outside environment of the cabinet 900 by the fan assembly 902. The liquid exits the fan assembly 902 and flows to the pump assembly 904A via lines 918A and 926A. It is noted that the direction of circulation is not limited to the exemplary aspect and the system can be configured to circulate the liquid in either direction.

Figure 9B:
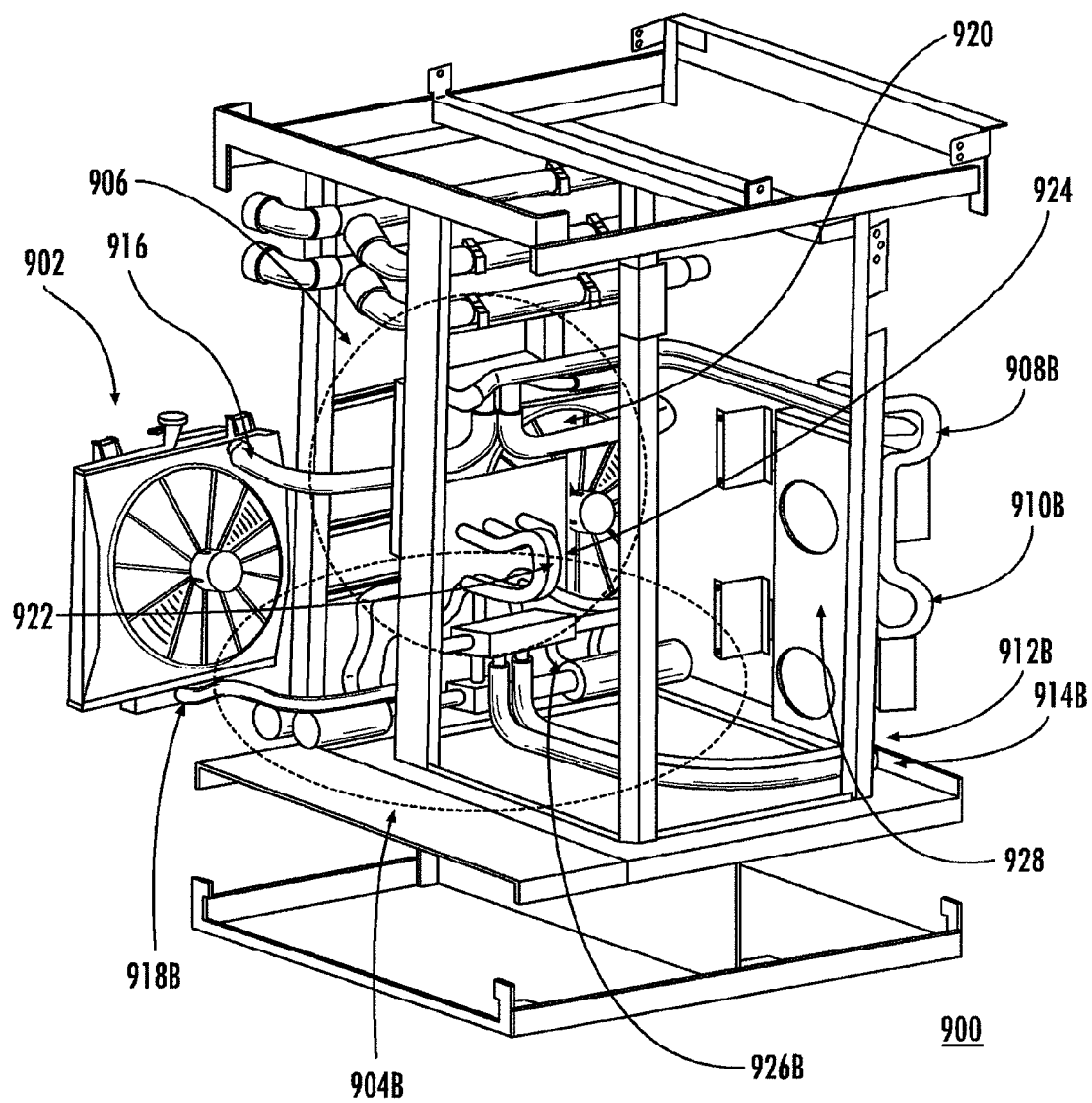
FIG. 9B is a partial view of a cabinet, according to an embodiment of the invention.

With reference to FIG. 9B, an exemplary aspect of a fuel cell cabinet 900 having one or more fuel cells and a dual cooling loop will now be described. The fuel cells are not illustrated in FIG. 9B so that the remainder of the system can be seen. The dual cooling loop may increase efficiency of the system, stabilize and maintain the temperature of the fuel cell, improve the capability of the system to reach full power faster, and/or extend the life of the system.

As shown in FIG. 9B, the dual cooling loop includes an internal loop and an external loop (e.g., a first loop and a second loop). In this aspect, the internal loop includes a pump assembly 904B, a liquid-to-liquid heat exchanger assembly 906, and one or more fuel cells (not shown). The external loop includes the pump assembly 904B, the liquid-to-liquid heat exchanger assembly 906, and a fan assembly (e.g., radiator assembly) 902.

As shown in FIG. 9B, a first liquid is pumped or drawn through lines 912B and 914B by the pump assembly 904B. The first liquid enters one or more fuel cells (not shown). The first liquid exits the fuel cells and is pumped or drawn through lines 908B and 910B to the liquid-to-liquid heat exchanger assembly 906. The first liquid transfers the heat from the fuel cells to a second liquid in the liquid-to-liquid heat exchanger assembly 906. The first liquid exits the liquid-to-liquid heat exchanger assembly 906 and is drawn or pumped through lines 922, 924 to the pump assembly 904B.

As shown in FIG. 9B, the second liquid is pumped or drawn through lines 916, 920 into the liquid-to-liquid heat exchanger assembly 906. The heat from the fuel cells is transferred from the first liquid to the second liquid in the liquid-to-liquid heat exchanger 906. The second liquid exits the liquid-to-liquid heat exchanger assembly 906 and is drawn or pumped through lines 918B, 926B to the fan assembly 902 (e.g., fan/radiator assembly). The heat from the second liquid is transferred to the outside environment of the cabinet 900 by the fan assembly 902.

In an aspect, the first liquid of the internal cooling loop is deionized water, and the second liquid of the external cooling loop is ethylene glycol water. One of ordinary skill in the art will recognize that the first and second liquids are not limited to the exemplary aspects.

Figure 10A:
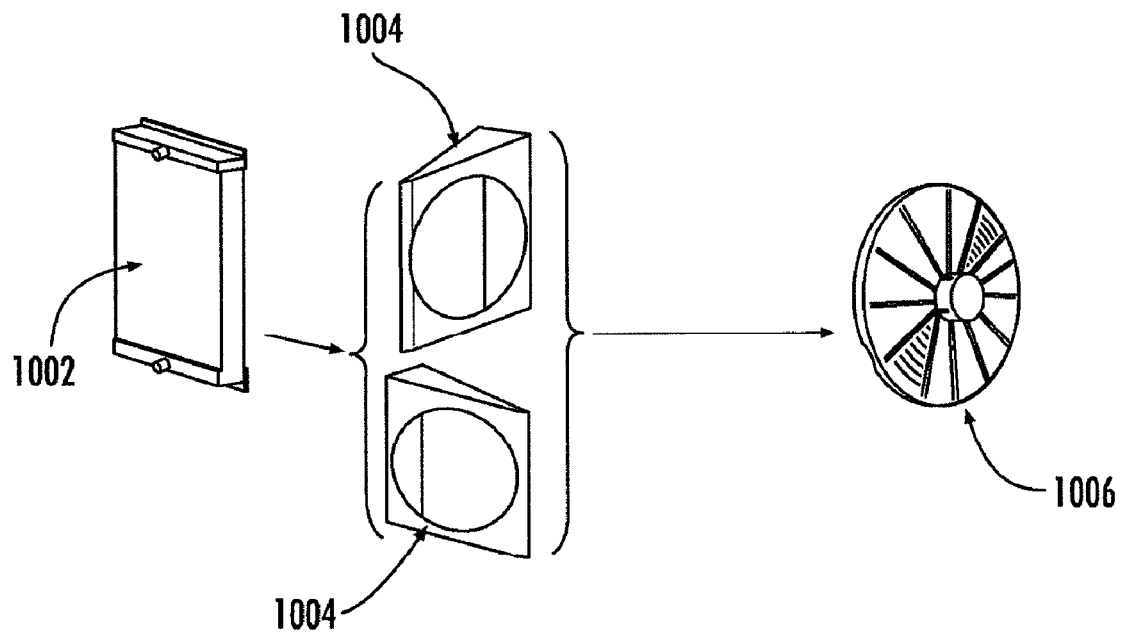
FIG. 10A is an exploded view of a fan assembly, according to an embodiment of the invention.
Figure 10B:
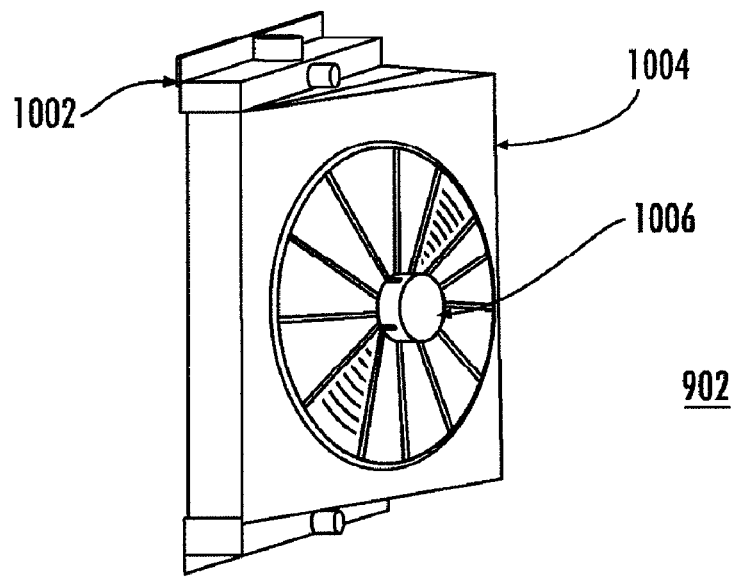
FIG. 10B is a perspective view of a fan assembly, according to an embodiment of the invention.

An exemplary aspect of the fan assembly 902 will now be described with reference to FIGS. 10A and 10B. As shown in FIGS. 10A and 10B, the fan assembly 902 includes a liquid-to-air heat exchanger 1002, one or more fan shrouds (e.g., first and second fan shrouds, or left and right fan shrouds) 1004, and a fan 1006. One of ordinary skill in the art will recognize that the fan 1006 can be any suitable fan and corresponding fan motor for passing air over or through the liquid-to-air heat exchanger. The fan 1006 can be mounted behind (i.e., on the interior side of) the liquid-to-air heat exchanger 1002. By mounting the fan 1006 behind the liquid-to-air heat exchanger (i.e., radiator) and pulling the air, the system provides an advantage of reducing the exposure of the fan 1006 to the external environment, which may extend the life of the fan and/or reduce an amount of maintenance needed for the fan.

Figure 11:
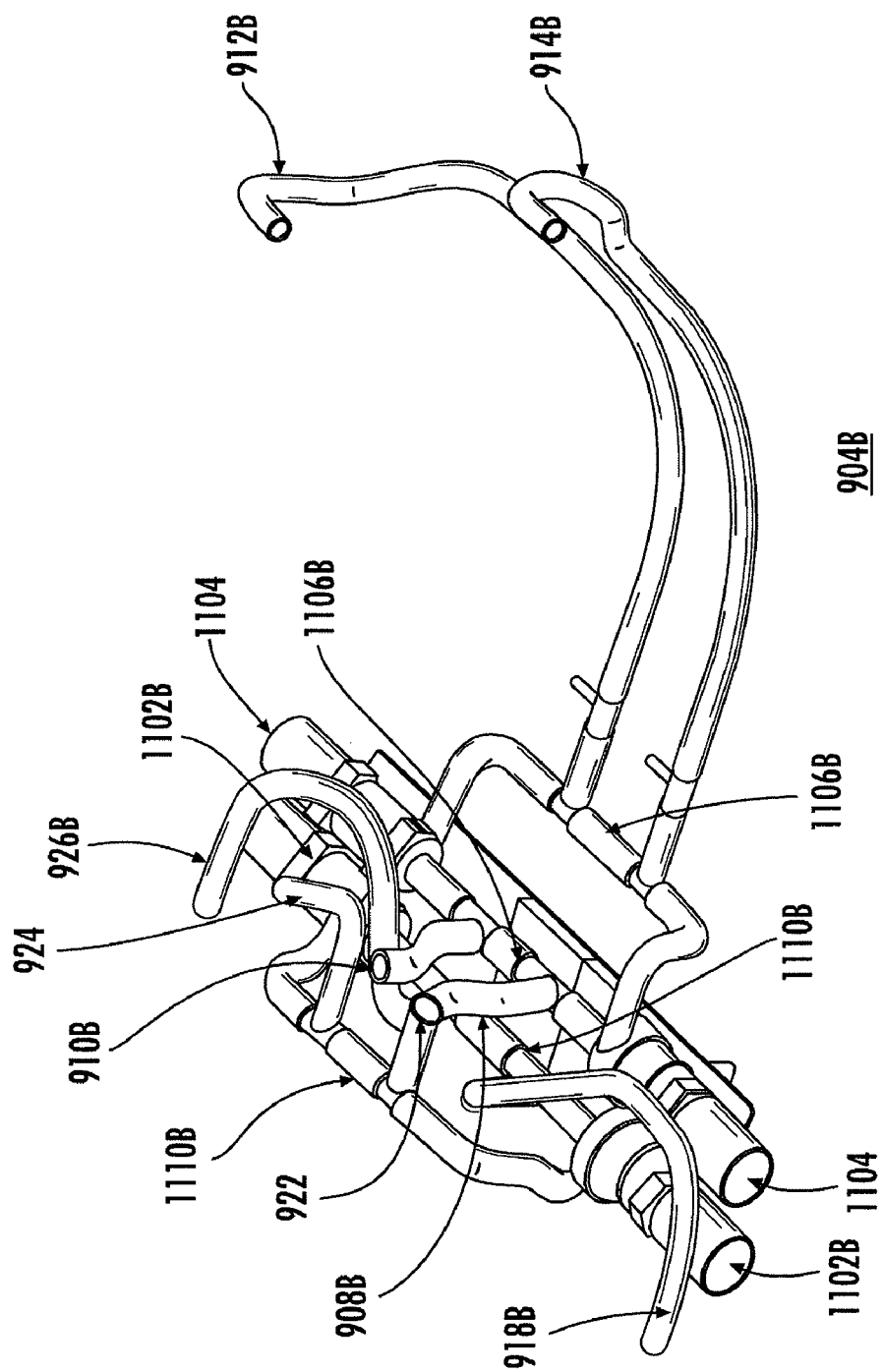
FIG. 11 is a perspective view of a pump assembly, according to an embodiment of the invention.

An exemplary aspect of the pump assembly 904B will now be described with reference to FIG. 11. As shown in FIG. 11, the pump assembly 904B includes redundant pumps 1102B for drawing or pumping the second liquid through lines 918B, 926B and 922, 924, which are shown in FIG. 9B. The pump assembly 904B includes one or more manifolds 1110B connecting lines 918B, 926B, 922, and 924. The pump assembly 904B further includes redundant pumps 1104 for drawing or pumping the first liquid through lines 912B, 914B, which are shown in FIG. 9B. The pump assembly 904B includes one or more manifolds 1106B connecting lines 912B, 914B.

Figure 12:
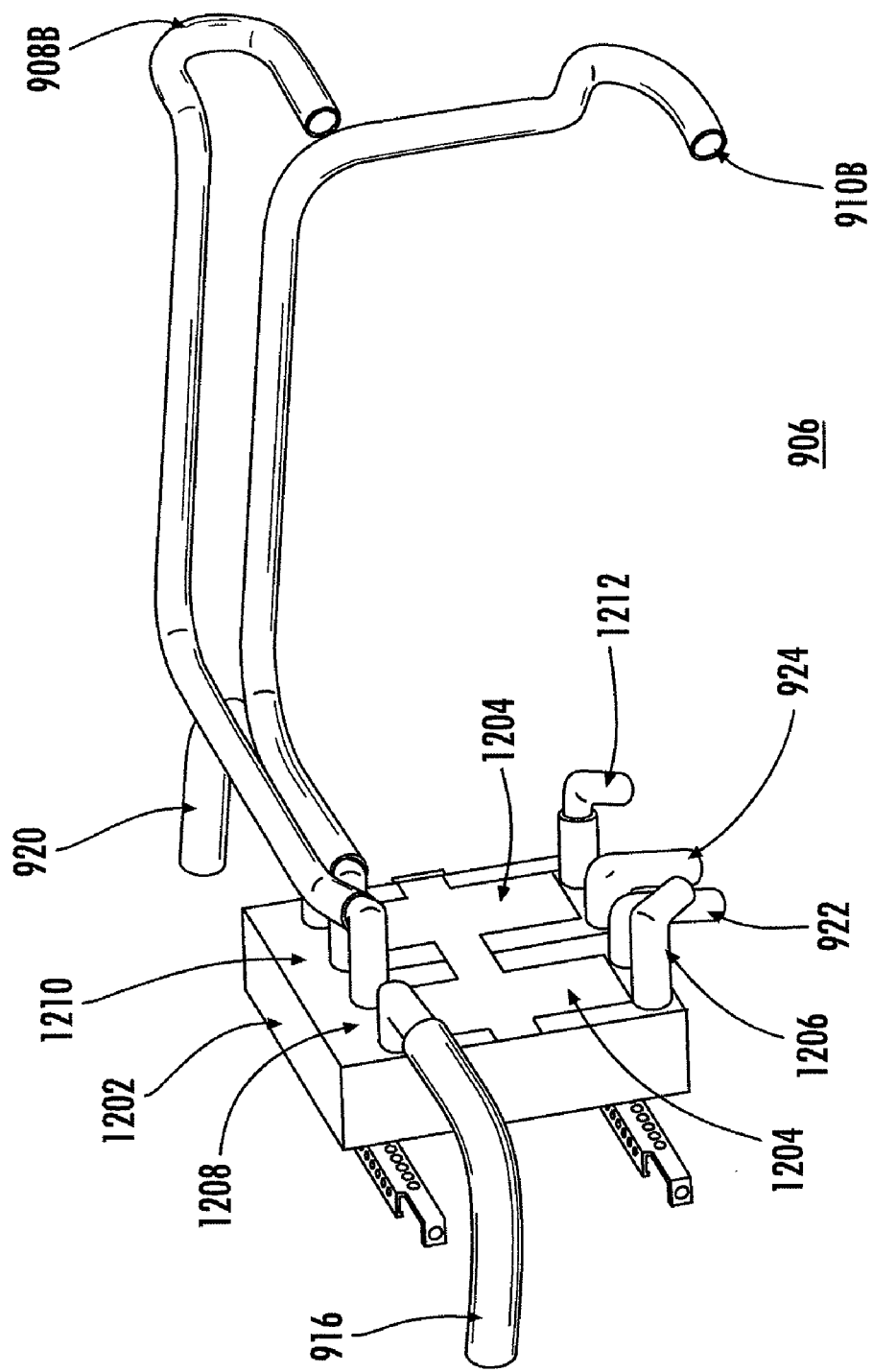
FIG. 12 is a perspective view of a liquid-to-liquid heat exchanger, according to an embodiment of the invention.

An exemplary aspect of the liquid-to-liquid heat exchanger assembly 906 will now be described with reference to FIG. 12. As shown in FIG. 12, the liquid-to-liquid heat exchanger assembly 906 includes an assembly casing 1202 that houses one or more liquid-to-liquid heat exchangers 1208, 1210. The lines 908B, 910B (see also FIG. 9B) transfer the first liquid from the fuel cells to the liquid-to-liquid heat exchangers 1208, 1210. The lines 922, 924 transfer the first liquid from the liquid-to-liquid heat exchangers 1208, 1210 to the redundant pumps 1104 of the pump assembly 904B. The lines 908B, 910B are coupled to elbows 1206, 1212 for transferring the second liquid from the liquid-to-liquid heat exchangers 1208, 1210 to the redundant pumps 1102B of the pump assembly 904B. The lines 916, 920 transfer the second liquid from the liquid-to-liquid heat exchangers 1208, 1210 to the fan assembly 902.

As shown in FIG. 12, another aspect of the liquid-to-liquid heat exchanger assembly 906 includes heaters 1204 mounted to the liquid-to-liquid heat exchangers 1208, 1210. The heaters 1204 can be a resistive heating element or the like. These aspects may be particularly suitable in cold climates for maintaining a minimum temperature of the liquid entering the fuel cells to optimize the operation of the fuel cells.

Figure 13A:
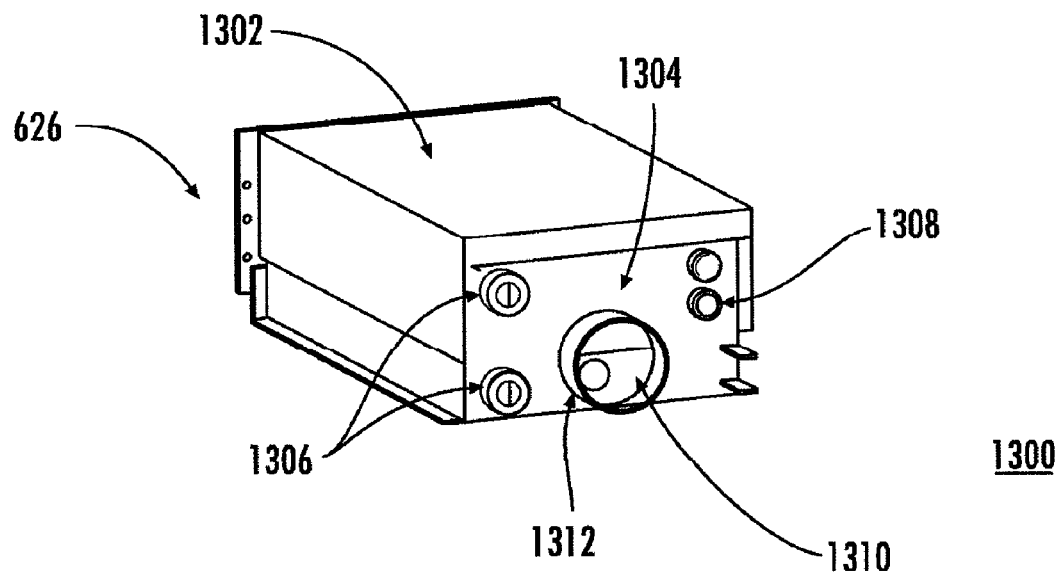
FIG. 13A is a perspective view of a fuel cell assembly, according to an embodiment of the invention.
Figure 13B:
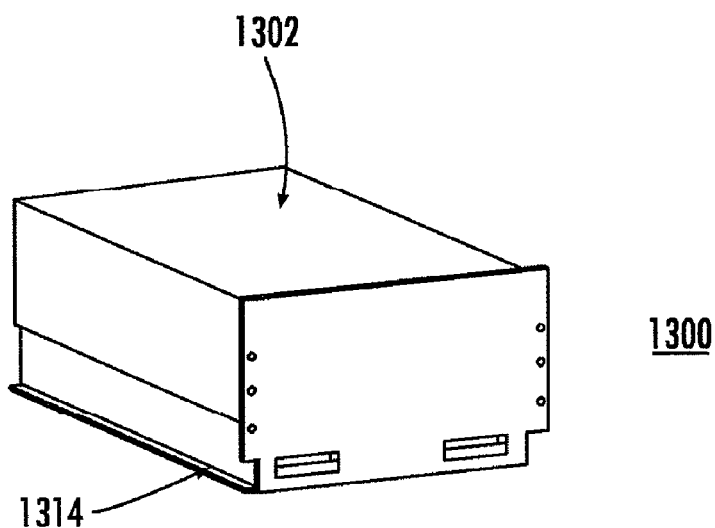
FIG. 13B is another perspective view of the fuel cell assembly of FIG. 13A.

An exemplary aspect of a fuel cell 1300, which can be mounted or secured in the exemplary cabinet 900, will be described with reference to FIGS. 13A and 13B. The fuel cell 1300 includes a sealed fuel cell enclosure 1302. The fuel cell enclosure 1302 includes air feed fittings 1308 and 1314 for permitting air to enter the fuel cell 1300. The enclosure 1302 includes a plenum sealing collar 1304 for sealing a first end of the fuel cell 1300 to the plenum 928 of FIG. 9A, 9B for hydrogen declassification. The plenum sealing collar 1304 includes a cathode exhaust 1312 and an anode exhaust 1310. The fuel cell enclosure 1302 includes liquid feed interface fittings 1306 for permitting the first liquid to enter and exit the fuel cell 1300, for example, via the lines 908A/908B, 910A/910B and 912A/912B, 914A/914B. The fuel cell 1300 can be a liquid cooled hydrogen fuel cell based on exchange membrane (PEM) technology. The fuel cell 1300 can be, for example, an 8 kW fuel cell. In an aspect, two 8 kW fuel cells 1300 can be used to provide 16 kW.

The exemplary aspects described herein provide a fuel cell cabinet that houses electronic equipment and that includes a fuel cell power backup system. The exemplary fuel cell cabinets having a liquid cooling system for controlling the temperature of the fuel cell power backup system. The aspects may increase a power density of the fuel cell cabinet. The liquid cooling system may provide redundancy, such as a redundant pump assembly, which reduces or eliminates system failures. The aspects provide one or more control loops to stabilize and maintain a constant fuel cell temperature. The aspects may reduce or minimize the time needed for the fuel cell to reach full power.

An example of the operation of a fuel cell cabinet according to an aspect will now be described. An aspect of the system operates via a controller to turn the cooling loops (e.g., internal and external cooling loops) ON and OFF to operate the fuel cell at defined fuel temperature set points.

For example, the water feed temperature to the fuel cell (e.g., 1300) commonly should be greater than 5° C. and less than 65° C. The water flow rate to the fuel cell (e.g., 1300) commonly should be greater than 30 l/min. The aspects commonly should be configured to operate, for example, in a telecom environment of −40° C. to +46° C.

The aspects recognize that the water temperature should not exceed +65° C., with a target temperature range of between 45° C. and 65° C. Accordingly, an aspect stabilizes and maintains the water temperature between 45° C. and 65° C. by providing a cooling loop system, such as a single cooling loop or a dual cooling loop.

In an aspect, the liquid-to-air heat exchanger (e.g., 906) is designed to cool an 8 KW fuel cell when the outside air temperature is between −40° C. to +46° C. and full solar loading as defined by GR487 while maintaining an acoustic noise reading below 65 dBA during normal operation as defined by GR 487 and GR 63.

According to aspects, the heat exchangers (e.g., 1208, 1210) can be cooled, for example, with a liquid such as water, deionized water (DI), EGW, or other suitable liquids or mixtures thereof, by a redundant cooling system of liquid manifolds (e.g., 1106), pumps (e.g., 1102B, 1104), liquid-to-liquid heat exchangers (e.g., 1208, 1210) and liquid-to-air heat exchangers (e.g., 1002). Another aspect is designed to work at the most efficient part of the pump curve for redundant pumps (e.g., 1102B, 1104).

As explained herein, an exemplary aspect provides a dual liquid cooling loop for the fuel cell cabinet. An internal cooling loop utilizes deionized water between the liquid-to-liquid heat exchanger (e.g., 906) and a fuel cell. This internal liquid loop dissipates the heat generated by the fuel cell to the liquid-to-liquid heat exchanger (e.g., 906). An external loop utilizes ethylene glycol water between the liquid-to-air heat exchanger (e.g., 902) and the liquid-to-liquid heat exchanger (e.g., 906). The ethylene glycol water may be used, particularly in colder environments, because it is resistant to freezing between −40° C. and 0° C., depending on the percentage of ethylene glycol within the water.

For aspects for use in colder environments, one or more heaters can be provided to heat the water entering the fuel cell from −40° C. to 0° C. with a varying water flow rate between 0 and 45 l/min. For example, in an aspect, the liquid-to-liquid heat exchanger (e.g., 906) includes a heating element (e.g., 1204), such as a resistive heating element. The heating element (e.g., 1204) can be attached to the liquid-to-liquid heat exchanger (e.g., 906) to maintain a liquid temperature that is greater than 5° C. when the outside temperature is between −40° C. and 0° C. The external loop dissipates the heat that is passed to the liquid-to-liquid heat exchanger (e.g., 906) from the fuel cell to the outside environment.

Aspects provide important advantages of balancing the air flow rates and the acoustic noise behind the splice chamber doors (e.g., 602, 604) of the cabinet (e.g., 600).

An aspect of the system is a controller (e.g., 206, 306) that selectively turns the cooling loops (e.g., internal and external cooling loops) ON and OFF to operate the fuel cell at defined or predetermined fuel temperature set points. As described herein, the fuel temperature set points can be based on factors including, but not limited to, the number of fuel cells, the type of fuel cells, the output of the fuel cells, the outside temperature or environmental temperature of the cabinet, the climate in which the cabinet is deployed, etc.

The operation of an exemplary system having a dual cooling loop according to an aspect will now be described with reference to Table 1.1 below.

TABLE 1.1

LIQUID LOOP THERMAL CONTROL

FCPM ON, the internal pump is ON.

| | |
|---|---|
| 1 | $T\_w => 0$ C., FCPM ON, internal liquid pump ON |
| 2 | $T\_w => 30$ C., FCPM ON, internal loop pump ON, external loop pump ON, radiator fan OFF. |
| 3 | $T\_w => 40$ C., FCPM ON, internal loop pump ON, external loop pump ON, radiator fan ON slow)(start at half speed and further define). |
| 4 | $T\_w => 50$ C., FCPM ON, internal loop pump ON, external loop pump ON, radiator fan ON full speed. |

FCPM OFF.

| | |
|---|---|
| 1 | $T\_a < 5$ C., liquid heat exchanger heater ON. |
| 2 | $T\_a > 13$ C., liquid heat exchanger heater OFF. |

As illustrated in Table 1.1, when the fuel cell power management (FCPM) is ON, the controller turns the internal pump ON. If the temperature of the water is greater than 0° C., then the controller turns the redundant pumps (e.g., 1104) of the internal cooling loop ON.

If the temperature of the water is equal to or greater than 30° C., then the controller turns the redundant pumps (e.g., 1102B, 1104) of the external and internal cooling loops ON, and the radiator fan (e.g., fan 1006) OFF.

If the temperature of the water is equal to or greater than 40° C., then the controller turns the redundant pumps (e.g., 1102B, 1104) of the external and internal cooling loops ON, and the radiator fan (e.g., fan 1006) ON slow. The controller can start the radiator fan at half speed and then further define the speed based on the specific temperature of the water.

If the temperature of the water is equal to or greater than 50° C., then the controller turns the redundant pumps (e.g., 1102B, 1104) of the external and internal cooling loops ON, and the radiator fan (e.g., fan 1006) ON full speed or high speed. The controller can start the radiator fan at half speed and then increase the fan speed to full or high speed.

If the temperature of the liquid within the liquid to liquid heat exchanger (L-L Hex) is less than 5° C., then the controller turns the liquid-to-liquid heat exchanger heater (e.g., 1204) ON. If the temperature of the liquid to liquid heat exchanger (L-L Hex) is greater than 13° C., then the controller turns the liquid-to-liquid heat exchanger heater (e.g., 1204) OFF.

The aspects provide a low cost cooling system for a fuel cell cabinet. The aspects provide redundancy to reduce or eliminate system failures. The aspects improve the efficiency of the fuel cell cabinet. The aspects maintain proper water temperatures for the fuel cell, which may enable the fuel cell to achieve faster power output. The aspects also may add or extend the life of the system. For example, by maintaining the temperature of the fuel cell below 65° C. may extend the life of the fuel cell.

The aspects of the cooling loop are not limited to application to a fuel cell cabinet, and may be applied to other devices, such as automotive devices having an external loop to cool an engine, food processing plants have dryers using external heat sources with liquid loops (e.g., similar to an internal loop). One of ordinary skill in the art will recognize that the aspects can be applied to other devices.

The aspects are not intended to be limited to the disclosed arrangements. For example, as exemplarily illustrated in FIGS. 14 and 15, aspects can include other features, such as one or more check valves 410, 510 to limit recirculation loops of water, for example, in the case of a failed pump or when only one pump is ON. For example, an aspect can include one or more check valves 410, 510 that limit flow of the first cooling liquid to a single direction, and/or one or more check valve that limit flow of the second cooling liquid to a single direction. One of ordinary skill in the art will recognize that the location of the check valves 410, 510 is not limited to the disclosed aspects, and the check valves can be located at other locations in the system.

Figure 14:
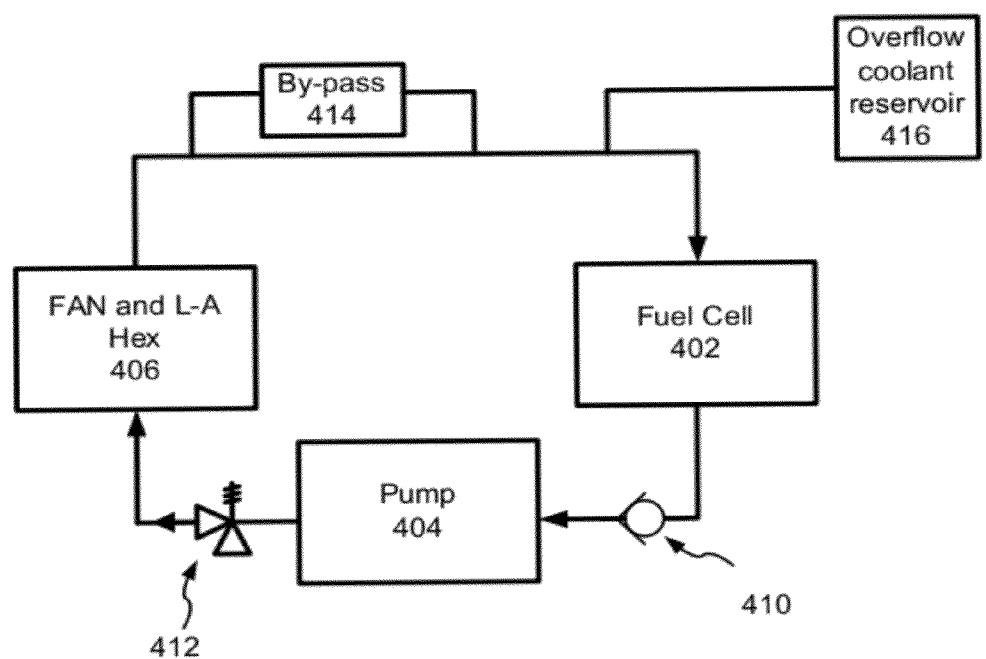
FIG. 14 is a schematic of a cabinet, according to another embodiment of the invention.
Figure 15:
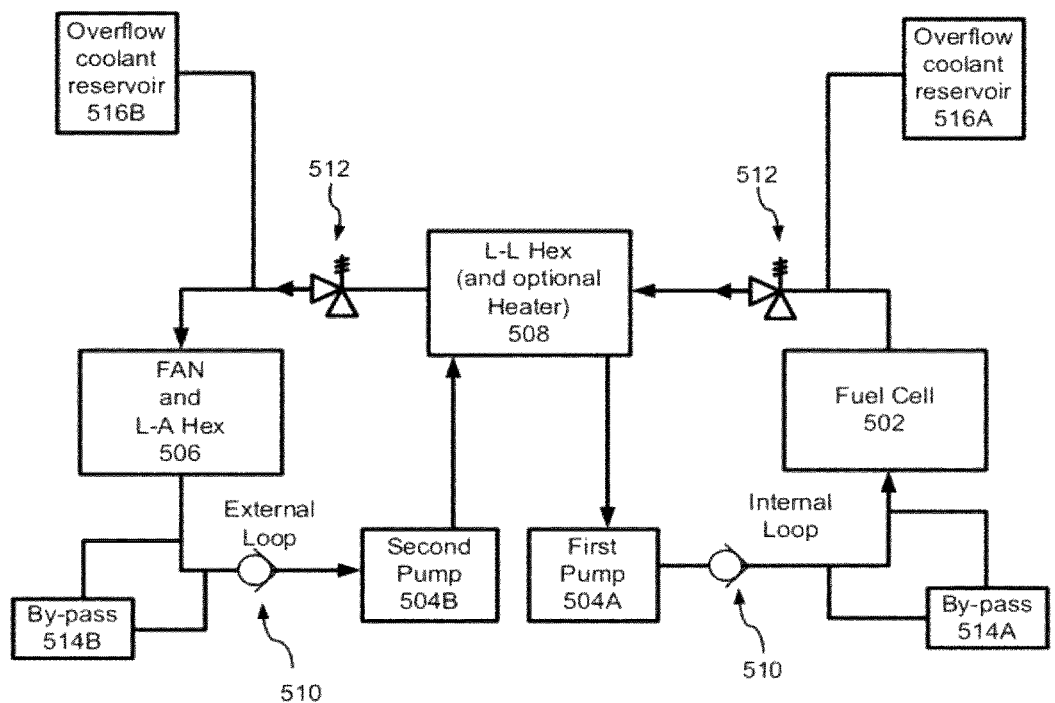
FIG. 15 is a schematic of a cabinet, according to another embodiment of the invention.

In another aspect, as exemplarily illustrated in FIGS. 14 and 15, the system can include a deionizer bypass line (e.g., 414, 514A, 514B) that can maintain water (e.g., the first cooling liquid and/or the second cooling liquid) at a prescribed resistance level (i.e., predetermined resistance level).

In another aspect, as exemplarily illustrated in FIGS. 14 and 15, the system can include an overflow coolant reservoir 416, 516A, 516B for high back pressure and fluid expansion conditions.

In another aspect, as exemplarily illustrated in FIGS. 14 and 15, the system can include a pressure relief valve 412, 512 to maintain pressure within system. One of ordinary skill in the art will recognize that the location of the pressure relief valves 412, 512 is not limited to the disclosed aspects, and the pressure relief valve can be located at other locations in the system.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto. Furthermore, although elements of the invention may be described or claimed in the singular, the plural is contemplated unless limitation to the singular is explicitly stated.

What is claimed is:

1. A cabinet comprising:
   electronic equipment housed within said cabinet, wherein said electronic equipment is for connection to subscriber lines or provider lines; and
   a fuel cell power backup system for providing backup power to said electronic equipment in the case of a power failure, wherein said fuel cell power backup system is housed within said cabinet and wherein said fuel cell power backup system includes:
      a fuel cell disposed inside said cabinet for generating the backup power;
      a liquid cooling system for dissipating heat generated by said fuel cell; and
      a controller that controls said liquid cooling system for maintaining a predetermined temperature range of a first cooling liquid of said fuel cell, wherein said liquid cooling system is a single loop liquid cooling system including:
   a liquid-to-air heat exchanger that receives said first cooling liquid from said fuel cell and dissipates heat from said first cooling liquid to an outside environment of said cabinet; and
   a pump that circulates said first cooling liquid between said fuel cell and said liquid-to-air heat exchanger.

2. The cabinet according to claim 1, wherein said pump includes a plurality of redundant pumps.

3. The cabinet according to claim 1, wherein said controller selectively turns said liquid-to-air heat exchanger and said pump ON and OFF based on one or more of a temperature of said first cooling liquid, a temperature of an outside environment, and a number of fuel cells.

4. The cabinet according to claim 1, wherein said cabinet is mounted to a concrete pad.

5. The cabinet according to claim 1, further comprising:
   a check valve that limits flow of said first cooling liquid to a single direction.

6. The cabinet according to claim 2, further comprising:
   at least one manifold that couples said plurality of redundant pumps.

7. The cabinet according to claim 1, wherein said liquid cooling system includes a deionizer bypass line that maintains a predetermined resistance level of said first cooling liquid.

8. The cabinet according to claim 1, wherein said liquid cooling system includes an overflow reservoir.

9. The cabinet according to claim 1, wherein said liquid cooling system includes a pressure relief valve.

10. The cabinet according to claim 1, wherein said liquid-to-air heat exchanger dissipates heat from said first cooling liquid to an outside environment via perforations in a door of said cabinet.

11. The cabinet according to claim 10, wherein said liquid-to-air heat exchanger includes a fan for moving air over or through said liquid-to-air heat exchanger and then out said perforations in said door of said cabinet.

12. A cabinet comprising:
electronic equipment housed within said cabinet, wherein said electronic equipment is for connection to subscriber lines or provider lines; and
a fuel cell power backup system for providing backup power to said electronic equipment in the case of a power failure, wherein said fuel cell power backup system is housed within said cabinet and wherein said fuel cell power backup system includes:
- a fuel cell disposed inside said cabinet for generating the backup power;
- a liquid cooling system for dissipating heat generated by said fuel cell; and
- a controller that controls said liquid cooling system for maintaining a predetermined temperature range of a first cooling liquid of said fuel cell, wherein said liquid cooling system is a dual loop liquid cooling system including:
- a liquid-to-liquid heat exchanger that receives said first cooling liquid from said fuel cell and dissipates heat from said first cooling liquid to a second cooling liquid in said liquid-to-liquid heat exchanger;
- a liquid-to-air heat exchanger that receives said second cooling liquid from said liquid-to-liquid heat exchanger and dissipates heat from said second cooling liquid to an outside environment of said cabinet; and
- a pump that circulates said first cooling liquid between said fuel cell and said liquid-to-liquid heat exchanger, and said second cooling liquid between said liquid-to-liquid heat exchanger and said liquid-to-air heat exchanger.

13. The cabinet according to claim 12, wherein said liquid-to-air heat exchanger includes a fan for moving air over or through said liquid-to-air heat exchanger.

14. The cabinet according to claim 12, wherein said pump includes a plurality of redundant pumps.

15. The cabinet according to claim 12, wherein said pump includes a first pump that circulates said first cooling liquid between said fuel cell and said liquid-to-liquid heat exchanger and a second pump that circulates said second cooling liquid between said liquid-to-liquid heat exchanger and said liquid-to-air heat exchanger.

16. The cabinet according to claim 12, wherein said liquid-to-liquid heat exchanger includes a heater that heats one of said first cooling liquid and said second cooling liquid to maintain the one of said first cooling liquid and said second cooling liquid at a predetermined temperature.

17. The cabinet according to claim 12, wherein said controller selectively turns said liquid-to-liquid heat exchanger, said liquid-to-air heat exchanger, and said pump ON and OFF based on one or more of a temperature of said first cooling liquid, a temperature of said second cooling liquid, a temperature of an outside environment, and a number of fuel cells.

18. The cabinet according to claim 12, further comprising at least one of:
- a first check valve that limits flow of said first cooling liquid to a single direction; and
- a second check valve that limits flow of said second cooling liquid to a single direction.

19. The cabinet according to claim 14, further comprising:
at least one manifold that couples said plurality of redundant pumps.

20. The cabinet according to claim 15,
wherein said first pump comprises a plurality of first redundant pumps, and
wherein said liquid cooling system includes at least one manifold that couples said plurality of first redundant pumps.

21. The cabinet according to claim 15,
wherein said second pump comprises a plurality of second redundant pumps, and
wherein said liquid cooling system includes at least one manifold that couples said plurality of second redundant pumps.

22. The cabinet according to claim 15, wherein said first cooling liquid is deionized water and said second cooling liquid is glycol water.

23. A cabinet comprising:
electronic equipment housed within said cabinet, wherein said electronic equipment is connected with provider lines and/or subscriber lines; and
a fuel cell power backup system for providing backup power to said electronic equipment in the case of a power failure, wherein said fuel cell power backup system is housed within said cabinet and wherein said fuel cell power backup system includes:
- a fuel cell disposed inside said cabinet for generating the backup power;
- an internal loop liquid cooling system for dissipating heat in said fuel cell including:
  - a first cooling liquid that receives heat from said fuel cell;
  - a liquid-to-liquid heat exchanger that receives said first cooling liquid from said fuel cell and dissipates heat from said first cooling liquid to a second cooling liquid in said liquid-to-liquid heat exchanger; and
  - a first pump that circulates said first cooling liquid between said fuel cell and said liquid-to-liquid heat exchanger; and
- an external loop liquid cooling system for dissipating heat in said second cooling liquid to an environment outside of said cabinet; and
- a heater that heats one of said first cooling liquid and said second cooling liquid to heat the one of said first cooling liquid and said second cooling liquid up to a predetermined temperature.

24. The cabinet according to claim 23, wherein said external loop liquid cooling system comprises:
- a liquid-to-air heat exchanger that receives said second cooling liquid from said liquid-to-liquid heat exchanger and dissipates heat from said second cooling liquid to an outside environment of said cabinet; and
- a second pump that circulates said second liquid between said liquid-to-liquid heat exchanger and said liquid-to-air heat exchanger.

25. The cabinet according to claim 24, wherein said liquid-to-air heat exchanger includes a fan for moving air over or through said liquid-to-air heat exchanger.

26. The cabinet according to claim 23, wherein said first pump includes a plurality of redundant pumps.

27. The cabinet according to claim 24, wherein said second pump includes a plurality of redundant pumps.

28. The cabinet according to claim 23, wherein said liquid-to-liquid heat exchanger includes said heater.

29. A cabinet comprising:
electronic equipment housed within said cabinet, wherein said electronic equipment is for connection to subscriber lines or provider lines; and
a fuel cell power backup system for providing backup power to said electronic equipment in the case of a power failure, wherein said fuel cell power backup system is housed within said cabinet and wherein said fuel cell power backup system includes:

a fuel cell disposed inside said cabinet for generating the backup power;

a liquid-to-air heat exchanger that dissipates heat to an outside environment of said cabinet; and a liquid cooling system that moves heat from said fuel cell to said liquid-to-air heat exchanger, said liquid cooling system including a pump that circulates one or more cooling liquids between said fuel cell and said liquid-to-air heat exchanger, wherein said liquid cooling system includes a deionizer bypass line that maintains a predetermined resistance level of at least one of the one or more cooling liquids.

30. The cabinet according to claim 29, further comprising:

a liquid-to-liquid heat exchanger interposing said fuel cell and said liquid-to-air heat exchanger, wherein said liquid-to-liquid heat exchanger dissipates heat from said fuel cell to said liquid-to-air heat exchanger, and wherein said pump circulates one or more cooling liquids between said fuel cell, said liquid-to-liquid heat exchanger, and said liquid-to-air heat exchanger.

31. The cabinet according to claim 29, wherein said liquid-to-air heat exchanger includes a fan for moving air over or through said liquid-to-air heat exchanger.

32. The cabinet according to claim 29, wherein said pump includes a plurality of redundant pumps.

33. The cabinet according to claim 30, wherein said liquid-to-liquid heat exchanger includes a heater that heats said one or more cooling liquids to maintain said one or more cooling liquids at a predetermined temperature.

34. The cabinet according to claim 29, wherein said cabinet is mounted to a concrete pad.

* * * * *